J. C. GREEN.
DYNAMOMETER TRANSMISSION DEVICE.
APPLICATION FILED MAY 20, 1916.
1,222,393.
Patented Apr. 10, 1917.
4 SHEETS—SHEET 4.
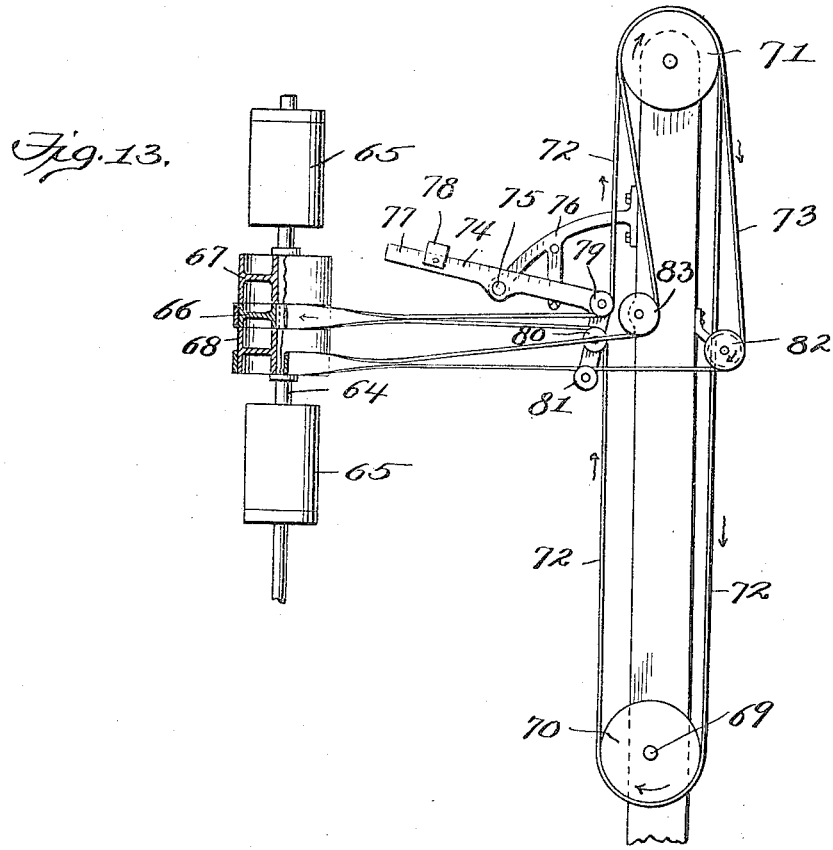
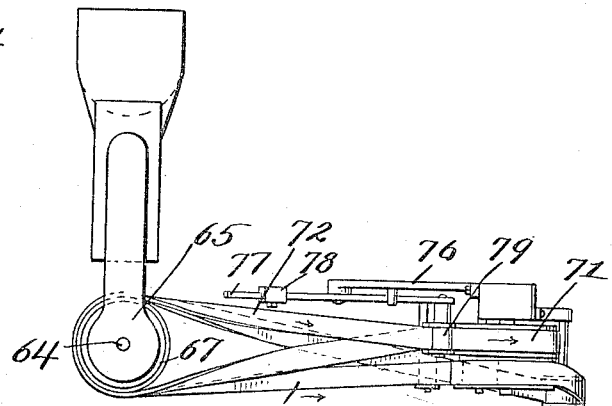
Witnesses:
Inventor
John C. Green
by
Attorney

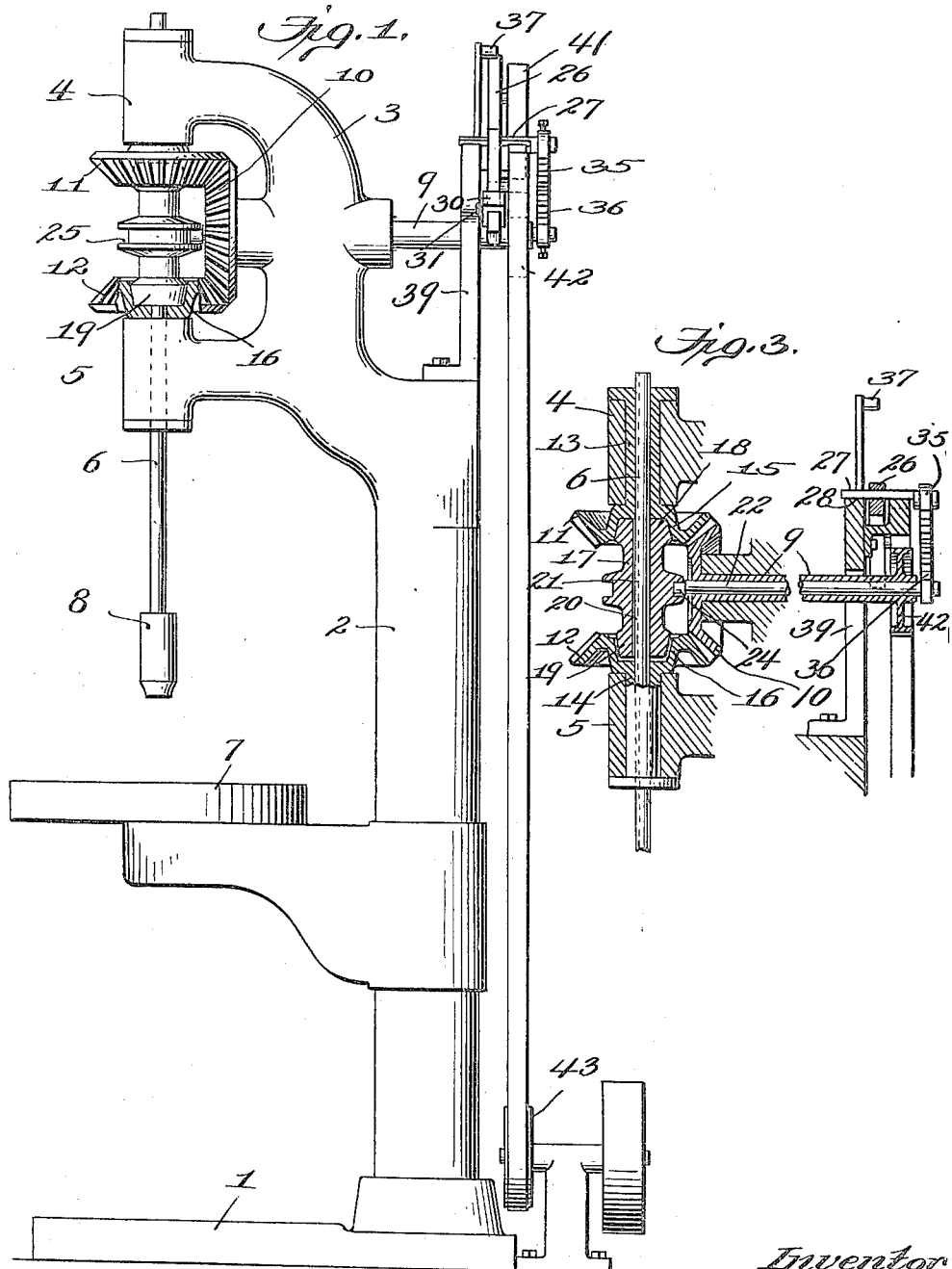

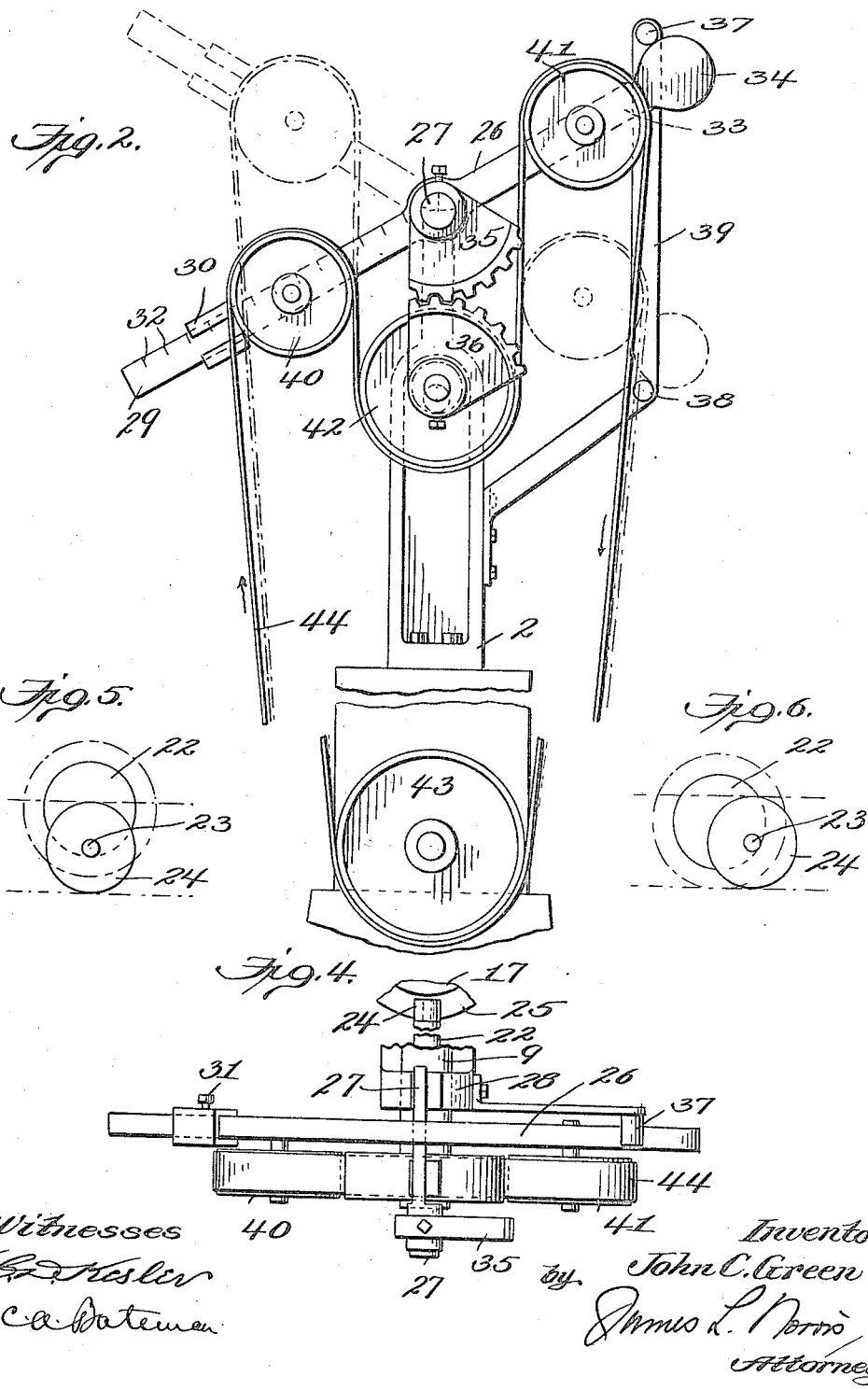

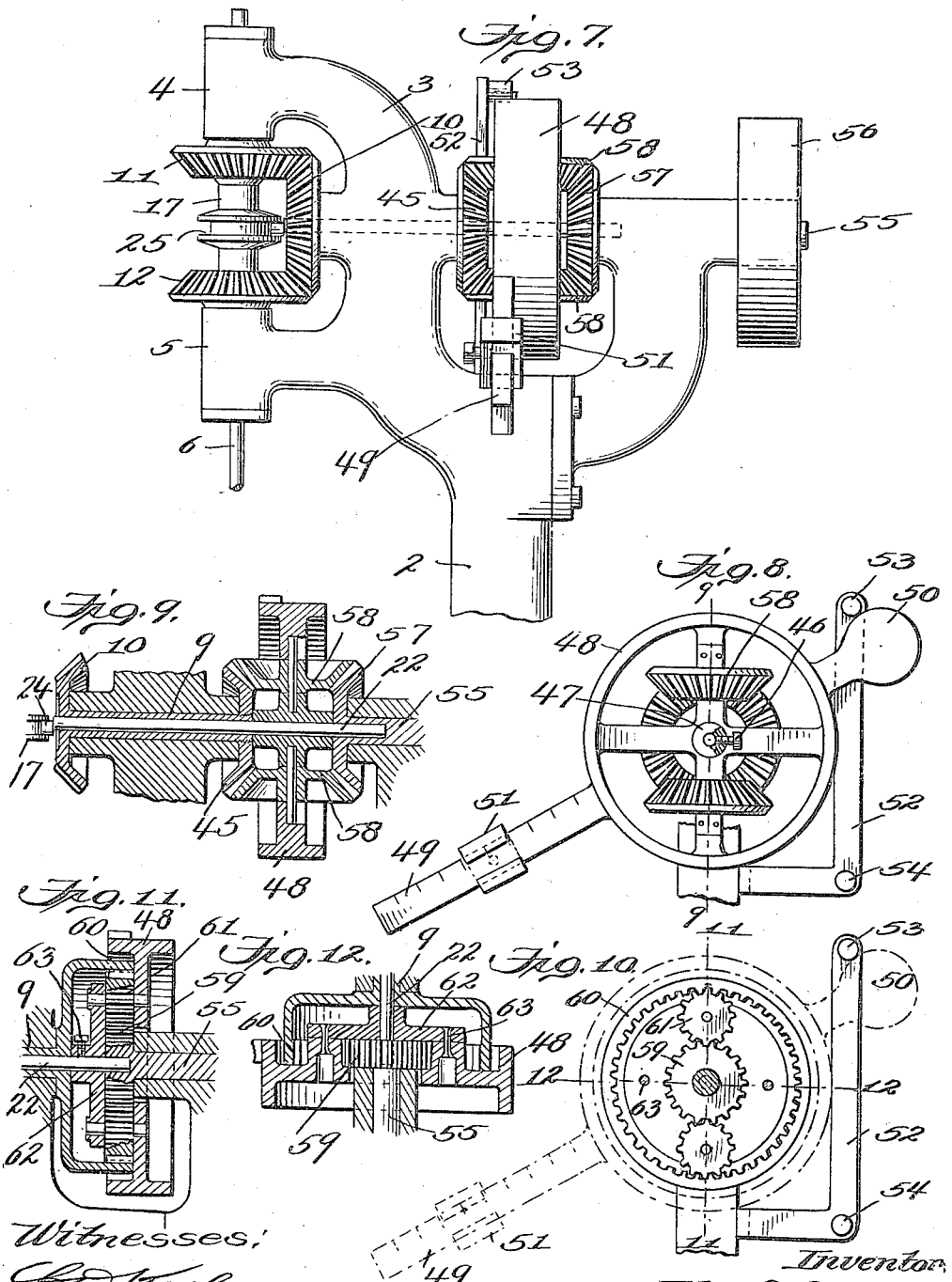

UNITED STATES PATENT OFFICE.

JOHN C. GREEN, OF HACKETTSTOWN, NEW JERSEY.

DYNAMOMETER TRANSMISSION DEVICE.

1,222,393.  Specification of Letters Patent.  Patented Apr. 10, 1917.

Application filed May 20, 1916.   Serial No. 98,877.

*To all whom it may concern:*

Be it known that I, JOHN C. GREEN, a citizen of the United States, residing at Hackettstown, in the county of Warren and State of New Jersey, have invented new and useful Improvements in Dynamometer Transmission Devices, of which the following is a specification.

My present invention relates to a dynamometer for measuring or determining the amount of power transmitted from a driving member to a driven member, and furthermore, to practical applications of a dynamometer of this character to a mechanism or machine, whereby the amount of power applied thereto will be measured or limited to a predetermined or selected degree and the operation of such mechanism or machine will be controlled accordingly by the dynamometer.

One of the objects of the invention is to provide a relatively simple and efficient dynamometer capable of use in connection with mechanisms or machines of various kinds for measuring or determining the amount of power transmitted to such mechanisms or machines, the dynamometer being so constructed that it may be quickly and easily adjusted for the transmission of power of different amounts.

Another object of the invention is to combine a dynamometer with a mechanism or machine whereby such mechanism or machine will be automatically relieved of the influence of its driving means when the resistance met with in the operation of the mechanism or machine reaches a definite or predetermined amount for which the dynamometer is set or adjusted.

Another object of the invention is to provide a combined dynamometer and drill press or tapping machine whereby rotation of the spindle in either instance will be arrested automatically and the spindle will be relieved of driving influence when a predetermined or definite amount of resistance to such rotation is encountered.

A further object of the invention is to so combine a dynamometer with a tapping machine or other machine having a reverse mechanism that the direction of rotation of the spindle of the tapping machine or the reverse mechanism will be automatically reversed when the resistance to such rotation reaches a predetermined amount as measured by the dynamometer, and when the invention is applied to a tapping machine, the forward rotation of the tap-carrying spindle is automatically reversed when a predetermined resistance to its forward rotation is encountered, and the direction of rotation of the spindle is again automatically reversed, or in other words, the forward rotation of the spindle is resumed, such reverse and rereverse in the direction of rotation of the spindle being automatically effected each time the tap meets with a certain or definite amount of resistance during the tapping operation. In this application of the invention, the dynamometer may also be quickly and easily adjusted to transmit power in different amounts, according to the sizes of the taps used.

To these and other ends, the invention consists in certain improvements, and combinations and arrangements of parts, all as will be hereinafter more fully described, the novel features being pointed out particularly in the claims at the end of the specification.

In the accompanying drawings:—

Figure 1 is a side elevation of a tapping machine to which one embodiment of the present invention has been applied.

Fig. 2 is a view of the dynamometer as viewed from the right in Fig. 1.

Fig. 3 represents a vertical section taken longitudinally of the horizontal drive shaft of the machine shown in Fig. 1.

Fig. 4 is a top plan view of the upper portion of the machine shown in Fig. 1.

Figs. 5 and 6 are diagrammatic views showing the clutch-shifting shaft and its roller in two positions.

Fig. 7 is a view of the upper portion of a tapping machine having another embodiment of the invention applied thereto.

Fig. 8 shows the dynamometer as viewed from the right in Fig. 7.

Fig. 9 represents a section through the dynamometer and the parts connected thereto on the line 9—9 of Fig. 8.

Fig. 10 is a view similar to Fig. 8 but showing a modification in the detail construction of the dynamometer as shown in Figs. 7, 8 and 9.

Figs. 11 and 12 represent transverse sections on the lines 11—11 and 12—12, respectively, of Fig. 10.

Figs. 13 and 14 show in elevation and in top plan, respectively, another embodiment of the dynamometer and reversing mechanism.

Similar parts are designated by the same reference characters in the several views.

The present invention provides a dynamometer which is relatively simple in construction, efficient in operation, and is capable of being readily and easily adjusted for the transmission of power in predetermined or definite amounts between a driving member and a driven member. Dynamometers embodying the present invention are capable of being used in many instances wherein it is desirable or necessary to measure the amount of power to be transmitted to a driven mechanism or machine. In many mechanisms and machines, it is necessary, in order to avoid injury either to the machine, the tool or tools operating thereby, or to the work upon which the machine is operating, to arrest the operation of the machine when a predetermined resistance to such operation is encountered. This is particularly so with drill presses and especially with tapping machines. In the operation of drill presses, the resistance to turning of the drill, due either to clogging of the hole, too rapid feeding, or other causes, must not exceed a definite amount for a drill of a given size, to avoid breakage of the drill, and the amount of resistance which the drills are capable of withstanding without breakage varies according to the size of the drills. And so, in tapping machines, the amount of resistance which each tap is capable of withstanding without breakage is limited, and this limited resistance varies according to the sizes of the taps.

It is to be understood that the invention is not limited in respect to the character of the mechanism or machine to which the dynamometer is applied. The invention, however, is shown in the drawings and will be hereinafter described in detail as applied to a tapping machine, as it is capable of effectively fulfilling the requirements which are incident to the operation of such machines. In this particular application of the invention, the forward rotation of the tap will be automatically reversed when the tap meets with a resistance to such rotation because of clogging of the tap or from other causes, the consequent reversal in the direction of rotation of the tap backing the tap out of the hole sufficiently to free the tap, whereupon the direction of rotation of the tap is again reversed automatically, that is to say, the forward rotation of the tap is resumed. The invention when applied to tapping machines insures the most rapid and efficient operation thereof, and it minimizes or prevents breakage of taps or spoiling of the work, as it enables the tap to be driven with a definite and measured amount of power which equals its safe limit of resistance to breakage, the reversals of the tap, so far as the same may be necessary, are effected quickly and automatically, and delays incident to changing taps because of breakage or damage to the work under operation are minimized or avoided.

Several embodiments of the invention are shown in the drawings and will be hereinafter described in detail, but it is to be understood that the invention is not limited to these particular embodiments of the inventions, as equivalent constructions are contemplated and will be included within the scope of the claims.

In the particular embodiment of the invention shown in Figs. 1–6 inclusive, a tapping machine is shown conventionally as comprising a base 1, a column or upright 2, a head 3 having bearings 4 and 5 in which the spindle 6 is journaled, and a table 7 to support or position the work relatively to the tap. It is usual to provide a chuck 8 on the lower end of the spindle to receive and hold the tap and to provide for an axial movement of the spindle relatively to the table to permit the tap to enter the hole as the tapping operation progresses and to enable the tap to be removed from the hole when the tapping operation has been completed. In the present instance, the spindle is driven or revolved by a driving shaft 9 which is suitably journaled in bearings in the frame of the machine, and suitable means is provided for driving or revolving the tap spindle in either a forward or a reverse direction. In the arrangement shown in this embodiment of the invention, a bevel gear 10 is fixed on the driving shaft 9 and it coöperates with a pair of bevel gears 11 and 12, which latter are in co-axial alinement and have sleeves 13 and 14 which fit revolubly upon the tap spindle 6 and are journaled in the bearings 4 and 5 of the frame. With this arrangement, the gears 11 and 12 which mesh permanently with the gear 10 revolve in reverse directions. A suitable clutch is provided for establishing a driving connection between either of the gears 11 or 12 and the tap spindle. Preferably, a friction clutch is employed, that shown in the present instance comprising clutch members 15 and 16 formed in the opposed faces of the gears 11 and 12, and a shiftable clutch member 17 having engaging portions 18 and 19 thereon, the portion 18 being adapted to engage the clutch member 15 of the gear 11 when the member 17 is shifted into its upper position, and the portion 19 engaging the clutch member 16 of the gear 12 when the clutch member 17 is shifted into its lower position. The shiftable clutch member 17 has a spline connection with the tap spindle whereby this clutch member will always rotate with the spindle and it will revolve the spindle in a forward direction when it is engaged with the upper gear 11 and will revolve the spindle in a reverse direction when it is engaged with the gear 12. As shown, the clutch member 17 contains a key 20 which is slidable in a key-way 21 formed in the spindle, the spline connection so provided maintaining the necessary driving relation between the clutch member 17 and the spindle, although permitting axial movement of the spindle within the clutch member 17 to allow for entrance and removal of the tap relatively to the hole, as well as permitting shifting of the clutch member 17 axially on the spindle to effect forward or reverse drive thereof as may be required. Shifting of the clutch member 17 to effect rotation of the tap spindle in forward or reverse directions may be produced in different ways. As shown in the present instance, the driving shaft 9 is hollow, and a clutch-shifting shaft 22 extends axially and loosely through this shaft, it having an eccentrically arranged pin 23 thereon on which is journaled a roller 24, and the roller just mentioned rides in a circumferential groove 25 formed in the shiftable clutch member 17. With this arrangement, the clutch-shifting shaft 22 does not revolve with the shaft 9, but rotation of the shaft 22 may take place independently, and when such rotation occurs in one direction it will couple the forward driving gear 11 to the tap spindle, while an opposite rotation of the shaft 22 will couple the reverse driving gear 12 to the spindle.

The dynamometer provided by the present invention and which will be now described measures or determines the amount of power transmitted to the tap spindle, and it operates automatically to reverse the direction of rotation of the tap spindle when the resistance met with by this spindle in its forward direction of rotation reaches a predetermined or definite amount. Furthermore, in this particular application of the invention, the direction of rotation of the spindle after having been reversed is again reversed automatically by the dynamometer, causing the spindle to resume its forward direction of rotation. The dynamometer provided by the present invention constitutes means through which power is transmitted to the machine to drive or operate it, the dynamometer embodying a member which is loaded or weighted to the desired degree within a suitable range of adjustment to counterbalance the resistance met with in the operation of the machine, and when this resistance reaches a predetermined amount, the counterbalancing effect of the member of the dynamometer is overcome and the dynamometer then operates automatically to interrupt the operation of the machine. As applied to a tapping machine employing a reversing device, the reversing device is actuated automatically to reverse the direction of rotation of the spindle, thereby withdrawing the tap from the hole sufficiently to free the tap, and as the resistance to the driving of the machine is thereby diminished, the dynamometer then operates automatically to actuate the reversing device to resume the driving of the tap in its forward direction.

Dynamometers embodying the present invention may be constructed in different ways. In the embodiment of the invention shown in Figs. 1–4 inclusive, the dynamometer comprises a member in the form of a lever 26 which is supported to rock preferably on knife-edges 27 which rest on knife-edge bearings 28, one arm 29 of the lever being provided with means for loading or weighting it in accordance with the amount of power to be transmitted. Preferably, and as shown, a weight 30 is slidable or adjustable longitudinally on this arm 29 of the lever, it having a set-screw or equivalent means 31 for holding it in its different set positions, and preferably this arm of the lever is provided with appropriate graduations 32 to indicate the different settings for the weight. The other arm 33 of the lever is provided with a counterweight 34, and this counterweight is proportioned to balance the lever on its knife edges when the weight 30 is set at zero, whereby the lever will be balanced or in equilibrium when no resistance is offered to the operation of the machine or driven part. In applying the dynamometer to a tapping machine or other mechanism employing a reversing device, the lever 26 is connected to the clutch-shifting part of the reversing device, this being the shaft 22 in the present instance. As shown in the present instance, the axis on which the lever 26 rocks is above or offset relatively to the driving shaft 9 of the machine, and suitable means, such as the gear segments 35 and 36, are fixed to the knife-edge 27 and clutch-shifting shaft 22 and serve to rotate the clutch-shifting shaft 22 in unison with the rocking movements of the lever 26. With this arrangement, rotation of the lever 26 through a predetermined angle about its knife-edge support as an axis will serve to shift the clutch member 17 to engage it with either the forward driving gear 11 or the reverse driving gear 12, and suitable stops are preferably provided for the lever at the limits of its movement. As shown, a stop 37 is arranged to engage the counterweight 34 when the lever 26 is in the position it occupies normally in the operation of the machine, and a stop 38 is arranged to engage the counterweight 34 when the lever is shifted to its other extreme position in which position the reverse operation takes place. These stops may be arranged in any suitable way, they being shown as carried by a frame 39 supported rigidly from the frame of the machine. In the dynamometer shown in Figs. 1–4 inclusive, a pair of belt pulleys 40 and 41 are journaled or supported by the lever 26 at opposite sides of its bearing, the shaft 9 of the machine which is to be driven through the agency of the dynamometer has a belt pulley 42 fixed thereon, and a suitable driving pulley 43 is provided, the latter serving to supply the power. An endless belt 44 leads from the driving pulley 43 over the pulley 40, thence under the pulley 42, thence over the pulley 41, and thence back to the driving pulley 43. This belt is under a tension sufficient to insure the necessary driving hold of the same on the pulleys 42 and 43, and it travels, in the present instance, in the direction indicated by the arrows.

With the dynamometer connected to the reversing device as described, and the belt engaging the driving pulley 43 of the machine, and, furthermore, with the weight 30 set on the member or lever 26 of the dynamometer at a point corresponding to the definite amount of resistance the machine may offer to its operation before interruption or reversal thereof, the belt 44 will drive the tap spindle in a forward direction and will continue to do so until or unless the resistance met with in the driving of the spindle reaches this definite or predetermined amount which is determined by the setting of the weight 30 on the dynamometer lever. During the normal operation of the machine, the dynamometer lever will occupy the position shown by the full lines in Fig. 2 with the counterweight 34 resting against the upper stop 37, the clutch member 17 being then engaged with the forward spindle-driving gear 11 and disengaged from the reverse gear 12. When, however, the resistance to the forward turning of the spindle reaches the predetermined amount for which the weight 30 on the dynamometer lever is set, such resistance will require an increased force to turn the driving pulley 43. This resistance will, in consequence, increase the tension on that side of the belt passing over the pulley 41 on the dynamometer lever and will correspondingly diminish the tension on that side of the belt passing over the pulley 40 on the dynamometer lever. By reason of the location of these pulleys 40 and 41 at opposite sides of the pivotal center of the knife-edges on which the dynamometer lever rests, the increased tension of the belt on the pulley 41 and the diminished tension of the belt on the pulley 40 will, when these values reach a predetermined point, rock the dynamometer lever into the dotted line position in Fig. 2, bringing the counterweight 34 against the lower stop 38. This rocking movement of the dynamometer lever is transmitted through the gear segments 35 and 36 to the clutch-shifting shaft 22, and the roller or projection 24 thereon will operate upon the clutch member 17 to disengage it from the forward driving gear 11 and to engage it with the reverse gear 12. By this operation, the forward rotation of the spindle is arrested and the spindle is rotated in a reverse direction. In a tapping machine, this reverse rotation of the tap spindle causes the tap to free itself in the hole, and as the resistance to the turning of the spindle quickly diminishes after its direction of rotation has been reversed, the tension of the belt on the pulley 41 correspondingly diminishes, while the tension of the belt on the pulley 40 correspondingly increases. This re-arrangement of the forces acting on the dynamometer lever restores the same to its former or normal condition, enabling the weight 30 to return the dynamometer lever to normal position with the counterweight 34 in engagement with the upper stop 37, and the return of the dynamometer lever to normal position correspondingly actuates the shaft 22 to shift the clutch member 17 out of engagement with the reverse gear 12 and into engagement with the gear 11, which latter again drives the spindle in its forward direction. This reverse and re-reverse of the spindle is automatically effected by the dynamometer when and as often as conditions may require during the tapping operation, and the reverse and re-reverse will depend upon the amount of resistance offered to the turning of the spindle, whereby the amount of power transmitted to the machine is measured according to the setting or adjustment of the dynamometer lever.

In this embodiment of the invention, during the operation of the belt 44, there will be no force tending to turn or rock the member 26 of the dynamometer when the spindle offers no resistance to its rotation, but when resistance is offered to the turning of the spindle, the belt will act upon the dynamometer lever with a tendency to turn or rock it about its bearing and in a direction to lift the loading weight thereon, the force so acting varying according to variations in the amount of resistance encountered by the spindle. When the resistance met with by the spindle reaches a predetermined degree, as determined by the setting of the loading weight 30 on the dynamometer lever, the latter will rock, reversing the direction of rotation of the spindle and then re-reversing its direction of rotation as hereinbefore described. From this it will be understood that the dynamometer provides means whereby the amount of resistance which the spindle is to sustain before interruption or reversal in the operation of the machine is effected is determined by the adjustment of the loading weight 30, and this weight can be adjusted to measure any desired amount of power for transmission to the spindle. For example in the operation of tapping machines or drills, the dynamometer will be adjusted to vary the amount of power transmitted to the spindle according to variations in the sizes of the taps or drills, it being understood that larger taps and drills require more power to operate them and they are capable of sustaining without breakage greater resistance than smaller taps and drills.

Figs. 7–12 inclusive show two other forms of dynamometer applied to a tapping machine of the same construction shown in Fig. 1. In these embodiments of the invention, the spindle, the reversing gear, including the clutch, and machine frame are the same as in Fig. 1, and it is therefore unnecessary to describe these parts in detail, they being correspondingly designated by reference characters in both instances. In Fig. 7, the driving shaft 9 is made shorter and has a bevel gear 45 fixed thereon. The clutch-shifting shaft 22 is fixed by a set-screw or equivalent device 46 to the hub 47 of a dynamometer lever 48, the latter in this instance being in the form of a frame having a graduated arm 49 extending from one side thereof and a counterweight 50 extending from its diametrically opposite side. A weight 51 is mounted adjustably on the arm 49, this weight or its equivalent serving to apply by its adjustments different loads upon the dynamometer. A frame 52 is provided which carries stops 53 and 54 which coöperate with the counterweight 50 and thereby limit the range of rotation of the dynamometer member about the clutch-shifting shaft 22 as an axis. A driving shaft 55 is provided having a pulley or equivalent means 56 through the agency of which power is transmitted to the member to drive the spindle. This driving shaft is journaled in the upper part of the frame of the machine and has a bevel gear 57 fixed on its inner end, the bevel gear 57 being opposed to the bevel gear 45. The outer end of the clutch-shifting shaft 22 may rest loosely in the inner end of the driving shaft 55 as a support. A suitable number of bevel gears 58 are mounted radially of the hub portion 47 of the dynamometer member. In the present instance, two of these bevel gears are shown and they mesh with the opposed bevel gears 45 and 57 arranged, respectively, on the shafts 9 and 55.

With this arrangement, power is transmitted to the machine by the pulley 56 and driving shaft 55. Rotation of the gear 57 on the driving shaft 55 revolves the gears 58, and the latter in turn revolve the gear 45 on the shaft 9. The latter will drive the spindle in a forward or reverse direction, depending upon the position of the clutch-shifting shaft 22, as described in the previous embodiment of the invention. When no resistance is offered to the turning of the spindle, the latter will be revolved idly and the dynamometer lever will occupy the position shown in Figs. 7 and 8, the counterweight 50 resting against the upper stop 53, and at this time there is no force acting with a tendency to rotate the dynamometer lever in a direction to lift the loading weight 51 thereon. When, however, resistance is offered to the turning of the spindle, a corresponding force acts with a tendency to rotate the dynamometer lever in a direction to lift the weight or load 51 thereon, and the amount of this force tending to rotate the dynamometer lever will correspond to the amount of resistance which is offered to the turning of the spindle. The weight 51 may be set in any desired position, depending upon the amount of resistance which it is desired the spindle should sustain before the operation of the machine is interrupted or reversed. In consequence, the dynamometer member will remain in the position shown in Fig. 8, with the counterweight 50 thereon in engagement with the stop 53, in which position the clutch mechanism will be in condition to drive the spindle in a forward direction, until a predetermined amount of resistance is offered to the turning of the spindle. When this occurs, the force acting on the dynamometer lever will be sufficient to turn it in a direction to lift the weight 51, the counterweight 50 moving from the upper stop 53 to the lower stop 54. Rotation of the dynamometer lever in this direction correspondingly rotates the clutch-shifting shaft 22, causing the clutch to reverse the direction of rotation of the spindle. Reversal in the direction of rotation of the spindle, as in the preceding instance, frees the tap or tool, thus diminishing the resistance to the turning of the spindle, and the weight 51 of the dynamometer lever will then act to restore the latter to its former position with the counterweight 50 in engagement with the upper stop 53. As the dynamometer resumes this position it rotates the clutch-shifting shaft 22 to re-reverse the direction of rotation of the spindle, or in other words, to cause the spindle to resume its forward rotation.

Figs. 10, 11 and 12 show a dynamometer of substantially the same construction as that shown in Figs. 7, 8 and 9, the arrangement of the gearing, however, being modified. In Figs. 10, 11 and 12, spur gears are employed instead of bevel gears, for the transmission of motion from the drive shaft 55 to the shaft 9. The shaft 55 has a spur gear 59 fixed on its inner end, and the shaft 9 has an internal spur gear 60 fixed thereon. A suitable number of spur pinions 61 are arranged to mesh with the gears 59 and 60, two of these pinions being shown. The dynamometer lever may be constructed the same as in the preceding instance, with the exception that the pinions 61 are connected at one side thereof with this dynamometer member while the pinions are connected at their opposite side with a head or disk 62, the latter being secured by a set-screw or equivalent means 63 to the clutch-shifting shaft 22. The head or disk 62 is secured to the dynamometer lever by any suitable means such, for example, as by the rivets 63, as shown in Fig. 12. These spur gears and pinions operate to transmit motion between the power shaft 55 and the spindle driving shaft 9 in the same manner as the bevel gears in Figs. 7, 8 and 9, and the pinions 61 will react on the dynamometer member, tending to turn it with a force corresponding to the amount of resistance encountered by the spindle in its rotation.

Figs. 13 and 14 show a dynamometer and reversing mechanism which employs belts instead of gears and clutches. In this instance, 64 represents diagrammatically the spindle of the tapping machine or drill press, the spindle being mounted in bearings 65 on the frame. This spindle has a driving pulley 66 keyed or otherwise fixed thereon, and a pair of loose pulleys 67 and 68 arranged at opposite sides thereof. Belt pulleys are shown and they are of equal diameter. 69 represents a driving shaft from which power may be taken to operate the machine. This shaft has a driving pulley 71 thereon, and an idler pulley 70 is arranged below it on a parallel axis. A belt 72 is driven from the pulley 71, it moving in the direction indicated by the arrow, and it serves to drive the spindle in a forward direction. A second belt 73 is driven from the pulley 71, and it serves to turn the spindle in a reverse direction. The dynamometer in this instance embodies a dynamometer member or lever 74 which is pivoted at 75 on a relatively fixed support 76, and the arm 77 thereof is graduated and receives a slidable or adjustable weight 78, or its equivalent. The dynamometer lever or member carries three guide pulleys 79, 80 and 81. The pulleys 79 and 80 face toward opposite sides of the pulleys 66, 67 and 68 and coöperate with the belt 72 as the latter operates between the pulleys 70 and 71. The belt 72 after passing from the idler pulley 70 passes over the guide pulley 80, around one of the pulleys 66 or 67, as the case may be, on the spindle 64, thence around the guide pulley 79, thence up over the driving pulley 71, and finally down to the idler pulley 70. The belt 73 which serves to drive the spindle in a reverse direction passes from the pulley 71 down around an idler pulley 82, thence over the guide pulley 81 on the dynamometer lever, it then crosses and passes around the pulley 66 or 68 on the spindle 64, passing from the latter pulley under a stationary idler pulley 83, and finally returns to the driving pulley 71.

In the operation of a dynamometer and reversing device constructed as just described, the portion of the belt 72 stretching between the guide pulley 79 on the dynamometer lever and the upper pulley 71 will be substantially equal to the tension on that part of this belt stretching between the idler pulley 70 and the guide pulley 80 on the dynamometer lever, when the spindle offers no resistance to its turning in a forward direction. The belt 72 will then pass around the fixed or driving pulley 66 while the crossed or reverse driving belt 73 will run idly on the loose pulley 68. The dynamometer lever will then occupy the position shown in Fig. 13, it resting against its lower stop, and the pulleys 80 and 81 thereon will guide the belts 72 and 73 respectively relatively to the pulleys on the spindle. When, however, a resistance is met with by the spindle which is of an amount equal to that for which the adjustable weight 78 is set on the dynamometer lever, the tension on that portion of the belt 72 extending between the guide pulley 79 on the dynamometer lever and the driving pulley 71 will exceed the tension on that portion of the belt 72 extending between the pulley 70 and the guide pulley 80 to an extent sufficient to rock the dynamometer lever on its pivot, and this rocking movement of the dynamometer lever shifts the belt-guiding pulleys 80 and 81 to transfer the forward driving belt 72 from the fixed or driving pulley 66 to the loose pulley 67, and it simultaneously transfers the crossed or reverse driving belt 73 from the loose pulley 68 to the fixed or driving pulley 66. In this manner, the direction of rotation of the spindle is reversed, but when the resistance to the turning of the spindle drops below the amount for which the adjustable weight 78 on the dynamometer is set, the dynamometer lever will return to the position shown in Fig. 13, shifting the guide pulleys 80 and 81 to positions where they will transfer the crossed or reverse driving belt 73 back to the loose pulley 68 and the forward driving belt 72 from the loose pulley 67 onto the fixed or driving pulley 66.

The present invention provides relatively simple and efficient means whereby the amount of resistance to operation, which it is desired a machine or driven element should sustain, is measured, and when such amount of resistance is reached, the operation of the machine is automatically interrupted. The dynamometer is capable of being easily and quickly set to measure amounts of resistance of different degrees, as circumstances may require. Moreover, the dynamometer is capable of being used in connection with driving devices of various kinds. For example, the means for controlling the operation of the machine may embody a clutch or a shiftable belt, as shown, or any equivalent thereof, and likewise it is capable of being used in connection with reverse devices of different kinds, either a reverse gearing or the straight and crossed-belt arrangements, as shown, or any equivalent thereof.

The dynamometer itself has been shown in different forms, but it is to be understood that any equivalent thereof is also contemplated and it is intended to include the same within the scope of the claims. The dynamometer may be readily proportioned and graduated to measure and indicate in terms of horse-power or any other standard of power measurement, the amount of power for which the dynamometer is set to transmit to the machine or driven element, by using known formulæ for the computing of horse-power based upon the speed or rate of transmission and the amount and leverage of the weight applied to the dynamometer lever.

I claim as my invention:—

1. A dynamometer for automatically measuring the amount of resistance to be sustained by a driven element, and for interrupting the operation of such element, comprising a pivoted dynamometer frame subject to a reaction acting to rock it corresponding to the resistance to operation met with by the driven element, a starting and stopping device through which said element is driven, said device being operative by rocking movement of the dynamometer frame, and means for applying forces of different amounts to said dynamometer frame whereby the amount of resistance to be sustained by the driven element may be measured or predetermined.

2. A driving element, a driven element, means for transmitting motion between said elements, and a dynamometer embodying means for measuring, and varying as desired, the amount of resistance to be sustained by the driven element and operative automatically to actuate the motion transmitting means and thereby free the driven element of driving effort when a measured or definite amount of resistance to its operation is met with.

3. A driving means, a driven element, a motion transmitting connection between the driving means and the driven element, a device controlling the connection between the driving means and the driven element, and a dynamometer embodying means for measuring, and varying as desired, the amount of resistance to operation to be sustained by said driven element and operative automatically when such resistance is met with to actuate said controlling device and thereby disconnect the driven element from its driving means.

4. In a machine, a driving means, a device for disconnecting the driving means, and a dynamometer embodying means for measuring the amount of resistance to operation to be sustained by the machine and operative automatically on said device to disconnect the machine from its driving means when the machine meets with a measured or predetermined amount of resistance and to reconnect the machine to its driving means when the amount of resistance to the operation of the machine is less than such measured amount.

5. In a machine, a driving means, a device for connecting and disconnecting the driving means, and a dynamometer adapted to transmit motion between said machine and its driving means and subject to a reaction corresponding to the resistance to operation met with by the machine, the dynamometer embodying means for measuring the amount of such resistance to be sustained by the machine and operative automatically on said controlling device to disconnect the machine from its driving means when a measured or predetermined amount of resistance to operation is met with by the machine and to reconnect the machine to its driving means when the amount of resistance met with by the machine is less than such measured amount.

6. A reversing device, and a dynamometer combined therewith, the dynamometer embodying means for measuring the amount of resistance to operation to be sustained by the reversing device and operative automatically to reverse the reversing device when the latter meets with a measured or definite amount of resistance to operation and to re-reverse the reversing device when the latter meets with a resistance to operation less than said measured amount.

7. In a machine, a driving means, a spindle or shaft and a reversing device for revolving it, a dynamometer adapted to transmit motion between said spindle and its driving means and subject to a reaction corresponding to the resistance to operation met with by the spindle and embodying means for measuring the amount of resistance to operation to be sustained by the spindle and operative automatically on said reversing device to reverse the direction of rotation of the spindle when the latter meets with a measured or definite amount of resistance to rotation.

8. In a tapping machine, the combination of the spindle thereof, driving means therefor, a reversing device for causing the spindle to revolve in forward and reverse directions, and means for transmitting motion between said machine and its driving means and subject to a reaction corresponding to the resistance to operation met with by the machine and operative automatically on the reversing device to reverse the direction of rotation of the spindle when the latter encounters a definite amount of resistance.

9. In a tapping machine, a spindle, a driving means, and a device embodying means for transmitting motion between said machine and its driving means and subject to a reaction corresponding to the resistance to operation met with by the machine, said device being operative automatically to reverse the direction of rotation of the spindle when the latter encounters a definite amount of resistance to rotation, said device embodying means for measuring the amount of such resistance.

10. In a tapping machine, a spindle, a driving means, and a device embodying means for transmitting motion between said machine and its driving means and subject to a reaction corresponding to the resistance to operation met with by the machine, said device being operative automatically to reverse the direction of rotation of the spindle when the latter encounters a definite amount of resistance to rotation, said device embodying adjustable means for variably measuring the amount of such resistance.

11. In a tapping machine, a spindle, a driving means, a reversing device for revolving the spindle in forward and reverse directions, and means operative automatically on the reversing device to reverse and re-reverse the direction of rotation of the spindle when the latter encounters a definite amount of resistance.

12. The combination of a tapping machine, a driving means, a connecting and disconnecting device between the machine and its driving means, and a dynamometer operative to automatically measure the amount of resistance offered to the operation thereof and to connect and disconnect it relatively to its driving means.

13. The combination of a tapping machine, a driving means, a connecting and disconnecting device between the machine and its driving means, and a dynamometer operative to automatically measure the amount of resistance to be sustained by the operation thereof and to automatically disconnect the machine from its driving means when such amount of resistance to operation is met with, and to reconnect the machine to its driving means when the amount of resistance to operation met with by the machine is less than said measured amount.

14. The combination in a tapping machine, of a spindle, a driving means therefor, a controlling device for connecting and disconnecting the spindle relatively to the driving means, and a dynamometer embodying means for automatically measuring the amount of resistance to operation to be sustained by the spindle and operative automatically when such measured amount of resistance is encountered to actuate the controlling device to disconnect the machine from its driving means and also operative to reconnect the machine to its driving means when the amount of resistance to operation met with by the machine is less than said measured amount.

15. The combination of a tapping machine, reversible driving means therefor, and a dynamometer embodying means for measuring the amount of resistance to operation to be sustained by the machine and operative automatically when such measured amount of resistance is reached to control said driving means and thereby reverse and subsequently re-reverse the operation of the machine.

16. The combination in a tapping machine, of a spindle, reversible driving means for the spindle, and a dynamometer embodying means through which power is transmitted to said driving means, the dynamometer having means for varying the amount of resistance to operation to be sustained by the spindle, the dynamometer being operative automatically on said driving means to reverse the direction of rotation of the spindle when a predetermined amount of resistance, measured by the dynamometer, is offered to the rotation of the spindle.

17. The combination of a tapping machine having a tap spindle, and means for driving it in a forward or a reverse direction, and a frame pivoted to rock through a limited angle and carrying means through the agency of which power is transmitted to the tap spindle, variations in the resistance to turning of the tap spindle causing said frace to rock, and such rocking of the frame controlling said driving means to cause the tap spindle to be reversed and re-reversed in its direction of rotation.

18. The combination in a tapping machine, of a tap spindle, driving means therefor, a reversing device for the spindle, and a rocking frame having means for applying a force thereto which will automatically weigh the amount of resistance of the tap spindle and operative on said reversing device to reverse said tap spindle when a definite and adjustable amount of resistance is met with by the tap.

In testimony whereof I have hereunto set my hand in presence of two subscribing witnesses.

JOHN C. GREEN.

Witnesses:
 EDWARD P. HUEBER,
 GEO. B. ACKLEY.